(12) United States Patent
Morrison

(10) Patent No.: US 12,533,917 B2
(45) Date of Patent: Jan. 27, 2026

(54) RETAINING RING, ARRANGEMENT AND METHOD FOR INSTALLING THE RETAINING RING

(71) Applicant: Vibracoustic SE, Darmstadt (DE)

(72) Inventor: Michael Morrison, Winsen (DE)

(73) Assignee: Vibracoustic SE, Weinheim (DE)

( * ) Notice: Subject to any disclaimer, the term of this patent is extended or adjusted under 35 U.S.C. 154(b) by 607 days.

(21) Appl. No.: 17/602,165

(22) PCT Filed: Feb. 17, 2020

(86) PCT No.: PCT/EP2020/054043
§ 371 (c)(1),
(2) Date: Oct. 7, 2021

(87) PCT Pub. No.: WO2020/207646
PCT Pub. Date: Oct. 15, 2020

(65) Prior Publication Data
US 2022/0212513 A1    Jul. 7, 2022

(30) Foreign Application Priority Data

Apr. 9, 2019 (DE) .......................... 102019109286.8

(51) Int. Cl.
*B60G 11/27* (2006.01)
*B60G 17/052* (2006.01)
*F16B 21/18* (2006.01)

(52) U.S. Cl.
CPC .......... *B60G 11/27* (2013.01); *B60G 17/0523* (2013.01); *F16B 21/183* (2013.01);
(Continued)

(58) Field of Classification Search
CPC ................ B60G 11/27; B60G 17/0523; B60G 2202/152; B60G 2204/126;
(Continued)

(56) References Cited

U.S. PATENT DOCUMENTS 2,568,124 A * 9/1951 Grauel .................. F16B 21/183
73/431
2,898,135 A * 8/1959 Wurzel ................ F16B 21/183
24/1
(Continued)

FOREIGN PATENT DOCUMENTS

CN       1369042 A    9/2002
CN       1440498 A    9/2003
(Continued)

OTHER PUBLICATIONS

Chinese Office Action and Search Report, 202080041312.0, dated Nov. 2, 2022, with translation.
(Continued)

*Primary Examiner* — Christine M Mills
*Assistant Examiner* — Dil K. Magar
(74) *Attorney, Agent, or Firm* — Fishman Stewart PLLC

(57) ABSTRACT

The invention relates to a retaining ring for securing a component. The retaining ring includes a ring segment having an outer circumference for fixing the retaining ring in the axial direction, a recess extending along a circumferential direction of the ring segment, and a closure element for closing off the recess. In embodiments, the ring segment forms a contact surface to fix the component in the axial direction, and the retaining ring has a locking device for locking the closure element in the recess. In embodiments, the locking device is concealed at least on one side of the retaining ring facing away from the contact surface.

21 Claims, 4 Drawing Sheets

(52) U.S. Cl.
CPC .. *B60G 2202/152* (2013.01); *B60G 2204/126* (2013.01); *B60G 2206/42* (2013.01); *B60G 2500/2021* (2013.01)

(58) Field of Classification Search
CPC ........ B60G 2206/42; B60G 2500/2021; F16B 21/183; F16B 21/16; F16B 21/18; F16B 21/186
USPC ............................. 411/512, 517, 521; 24/284
See application file for complete search history.

(56) References Cited

U.S. PATENT DOCUMENTS

| | | | | |
|---|---|---|---|---|
| 3,662,642 | A | * | 5/1972 | Bernard ................ F16B 21/186 411/518 |
| 3,924,957 | A | * | 12/1975 | Camosso .............. F16C 33/586 384/538 |
| 4,425,078 | A | * | 1/1984 | Robbins ................. F01D 25/12 415/138 |
| 5,752,296 | A | * | 5/1998 | Chaput ................ H01R 13/635 411/3 |
| 6,918,728 | B1 | | 7/2005 | Frauhammer |
| 7,868,845 | B2 | * | 1/2011 | Gratton ..................... F16B 2/10 343/915 |
| 7,927,021 | B2 | | 4/2011 | Schumacher |
| 7,946,001 | B2 | * | 5/2011 | Krauss .................... F16L 33/08 24/282 |
| 8,365,366 | B2 | * | 2/2013 | Fouqueray ............. F16L 23/08 24/284 |
| 8,635,747 | B2 | * | 1/2014 | Felber ................... F16L 33/035 24/282 |
| 8,720,907 | B2 | * | 5/2014 | Worley ................... F16L 21/08 24/282 |
| 8,734,020 | B2 | * | 5/2014 | Ito ............................ F16F 1/027 384/448 |
| 8,849,513 | B2 | * | 9/2014 | Coombs ............. B60G 17/0523 701/37 |
| 2004/0012201 | A1 | | 1/2004 | Bartholoma |
| 2007/0107166 | A1 | * | 5/2007 | Kastner ................... F16B 21/18 24/16 R |
| 2009/0295677 | A1 | * | 12/2009 | Gratton .................... H01Q 1/42 411/517 |
| 2010/0138116 | A1 | | 6/2010 | Coombs |
| 2015/0236406 | A1 | * | 8/2015 | Wright .................... H01Q 1/12 403/274 |
| 2015/0323563 | A1 | * | 11/2015 | Todd ....................... G01R 1/04 24/484 |

FOREIGN PATENT DOCUMENTS

| | | | | |
|---|---|---|---|---|
| CN | 101253343 A | | 8/2008 | |
| EP | 2492529 A1 | * | 8/2012 | .......... F16C 33/7886 |
| JP | 2013092208 A | * | 5/2013 | ............. F16B 21/18 |
| WO | WO-2011049020 A1 | * | 4/2011 | .......... F16C 33/7886 |

OTHER PUBLICATIONS

International Search Report, PCT/EP2020/054043, dated May 25, 2020.

* cited by examiner

RETAINING RING, ARRANGEMENT AND METHOD FOR INSTALLING THE RETAINING RING

CROSS-REFERENCE TO RELATED APPLICATIONS

This application is a National Stage Patent Application of International Patent Application No. PCT/EP2020/054043, filed Feb. 17, 2020, which claims the benefit of German Application Serial No. 10 2019 109 286.8, filed Apr. 9, 2019, the contents of each are incorporated by reference in their entireties.

TECHNICAL FIELD

The invention relates to a retaining ring for securing a component, to an arrangement which comprises the retaining ring, and to a method for installing the retaining ring.

BACKGROUND

So-called circlips are known in the prior art, and are used for the positive, axial fixation of components. They are typically made of spring steel wire, and can be opened to allow disassembling the installed, secured component. However, in conditions where tolerances are problematic, or at high loads, retaining rings can undesirably loosen. It is possible to provide a locking mechanism that would prevent the retaining ring from opening, using additional components. However, such locking mechanisms are not able to prevent improper disassembly. Additional components or additionally integrated geometry elements are required for this purpose.

SUMMARY

It is therefore the object of the present invention to provide a retaining ring by means of which improper disassembly can be prevented, and by means of which misuse can be indicated by unavoidable damage to the component during disassembly.

This object is achieved by the retaining ring according to claim 1, by the arrangement according to claim 12, and by the method according to claim 14. Advantageous configurations of the retaining ring and the arrangement are the subject of the dependent claims.

The retaining ring according to the invention is used to secure a component against improper disassembly, and comprises a ring segment which has an outer circumference for fixing the retaining ring in the axial direction, and a recess extending along a circumferential direction of the ring segment, and comprises a closure element for closing off the recess, wherein the ring segment forms a contact surface in order to fix the component in the axial direction, and wherein the retaining ring has a locking device for locking the closure element in the recess, which is concealed at least on a side of the retaining ring facing away from the contact surface.

Within the meaning of the invention, a component to be secured can in particular be a component that is used in an air spring or an air spring strut, such as a switching valve or a cover of a strut support bearing or strut head bearing.

The outer circumference of the ring segment is advantageously suitable for positively fixing the ring segment in the axial direction; however, a non-positive fixing can also be contemplated. The recess in the ring segment is used to compress the ring segment to a smaller diameter (hereinafter referred to as the installation diameter) for installation. After the installation of the ring segment, it opens outward again due to the spring-back forces, or it is opened by a device. The closure element can then be inserted into the recess of the ring segment. The closure element is also advantageously designed as a ring segment. The ring segment and the closure element particularly advantageously form a circumferentially closed ring element after the closure element has been inserted. The closure element advantageously extends along the circumference of the ring element over an angular range of at most 90°, particularly advantageously at most 60°. The cross sections of the closure element and the ring segment can be different in design.

Since the locking device is concealed at least on the side of the retaining ring facing away from the contact surface, it cannot be accessed when in the installed state. The locking device is also advantageously concealed on the inside of the retaining ring, such that the locking device cannot be accessed from there either. This prevents improper disassembly, and the misuse can be seen because of the visible damage, since the locking device can no longer be accessed after the installation of the ring segment and closure element, and consequently the closure element can no longer be removed without destruction. This prevents the retaining ring from being disassembled and reinstalled without any visible damage which could indicate misuse.

The locking device is advantageously concealed by the closure element and/or the ring segment on the side of the retaining ring facing away from the contact surface and/or on the inside of the retaining ring.

In an advantageous embodiment, the locking device is provided on the closure element. This can be done by providing a molded part that is integrated into the closure element. Alternatively, the locking device can be integrated into the ring segment.

The ring segment and the closure element are advantageously connected to each other by means of a snap-on connection. The locking device is particularly advantageously designed as a catch spring. A snap-on connection is a type of connection that enables particularly easy installation of the retaining ring, since the connection is established automatically when the closure element is inserted, without the need for further installation steps. In addition, the snap-on connection constitutes a stable form of connection that can absorb forces that occur during operation. Without the closure element, these operating forces could lead to compression of the ring segment, as a result of which it could jump out of the housing and lose its intended safety function. The snap-on connection must be designed in such a way that it has flexible properties in the installation direction—that is to say, it enables installation of the closure element. If the locking device designed as a catch spring is concealed on the side of the retaining ring facing away from the contact surface, it is not accessible when the retaining ring is installed, such that the snap-on connection cannot be released without damaging the retaining ring.

In an advantageous embodiment, the closure element and the ring segment are designed as separate individual parts. Alternatively, the closure element can be pivotably connected to the ring segment. The closure element can preferably be connected to the ring segment by an integral hinge. The retaining ring thus comprises few individual parts, and allows a simple installation.

In an advantageous embodiment, the outer circumference of the retaining ring has a projection for engaging in a recess of a housing. The projection can be circumferential, that is to say extend over the entire outer circumference, be interrupted, or only be provided at certain points. In particular, the projection can be designed in such a way that it can engage in a housing groove. The projection is used for axial fixation and securing against the retaining ring jumping out of the housing. For this purpose, the projection preferably has a stiffening region and/or the ring segment has stiffening ribs.

The closure element and/or the ring segment are advantageously made of a plastics material. A plastics material offers a high degree of freedom in the design of components, which prevents an unnoticed, improper opening of the ring.

In an advantageous embodiment, a ratio of a length (L) in the axial direction of the ring segment to a height (H) of the ring segment is between 0.5 and 5. The ratio is particularly advantageously between 0.75 and 2.5. The height of the ring segment is defined as half the difference between the outer diameter and the inner diameter. The length corresponds to the extension of the ring segment in the axial direction. The specified ratios lead to a high geometrical moment of inertia against torsion, since the length of the ring segment in the axial direction is approximately as great or greater than its height.

A ratio of an inner diameter of the ring segment to the height is advantageously at least 3, that is to say the inner diameter corresponds to at least three times the height. The ratio is particularly advantageously at least 4. This ensures advantageous resilience to allow compressing the ring segment for installation, while the ring can also snap positively into an outer guide.

In an advantageous embodiment, a ratio of the length to the inner diameter of the ring segment is at least 1:8. The ratio is particularly advantageously at least 1:6.

The ring segment has advantageous torsional stiffness because the cross section of the ring segment has the highest possible moment of inertia in relation to torsion, but at the same time a reduction in the overall diameter during installation is still possible without destruction. As such, the closure element cannot be removed by bending or twisting the retaining ring as a whole. Due to the advantageous proportions of length, height and inner diameter of the ring segment, it is sufficiently torsion-resistant to be able to transmit high axial forces. As a result, no further supporting structures with the task of preventing twisting of the retaining ring, and thus undesired disassembly, are necessary.

The arrangement according to the invention comprises a housing and a component which is secured in the housing by the retaining ring. The retaining ring is advantageously fixed in the axial direction in the housing by means of its outer circumference, preferably in a positive manner, and rests with the contact surface on the component in order to fix the component in the axial direction.

The method according to the invention for installing a retaining ring comprises the following steps:
  Providing a housing, in which a component is arranged, and providing the retaining ring, wherein the recess is not closed off,
  Compressing or contracting the ring segment in order to elastically reduce an outer diameter of the ring segment to an installation diameter,
  Inserting the ring segment into the housing in such a way that the contact surface rests against the component, in order to fix it in the axial direction,
  Releasing the ring segment, such that it springs back to the outer diameter and is fixed in the housing in the axial direction by means of its outer circumference, preferably in a positive manner, and Closing off the recess by means of the closure element.

BRIEF DESCRIPTION OF THE DRAWINGS

The invention is described in more detail below with reference to embodiments, which are shown schematically in the drawings, wherein.

DETAILED DESCRIPTION

Figure 1:
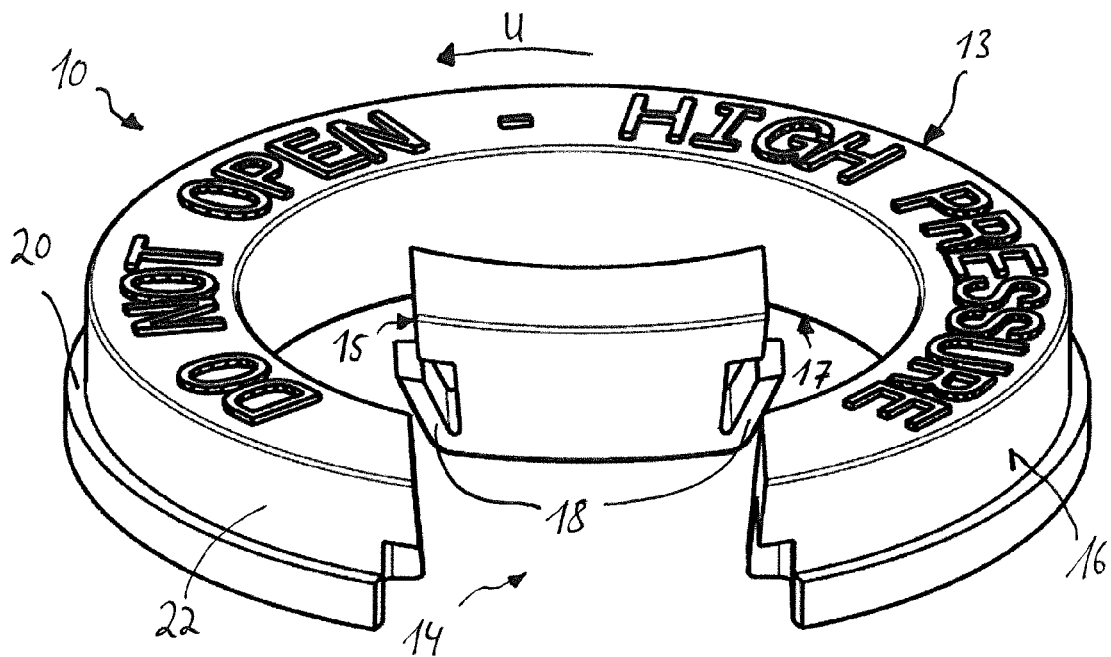
FIG. 1 is a perspective view of the retaining ring according to the invention, according to a first embodiment.
Figure 2:
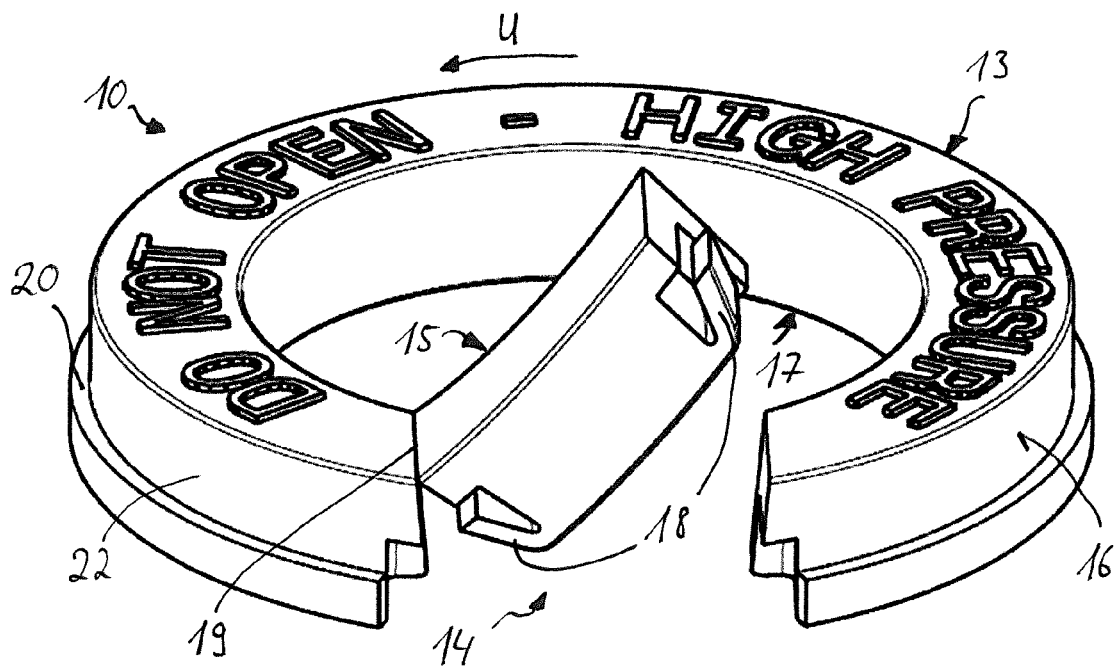
FIG. 2 is a perspective view of the retaining ring according to the invention, according to a second embodiment.

FIGS. 1 and 2 each show a retaining ring 10 for a component 11, which in the present case is a switching valve. The retaining ring 10 has a ring segment 13 and a closure element 15 which are made of a plastics material. A recess 14, which extends along a circumferential direction U of the ring segment 13, and an outer circumference 16 are provided on the ring segment 13. A circumferential projection 20, which forms a support shoulder 22, is attached to the outer circumference 16. Furthermore, the ring segment 13 has a contact surface 17 for fixing a component.

The closure element 15 is used to close the recess 14. In the embodiment according to FIG. 1, the closure element 15 and the ring segment 13 are designed as separate individual parts, while in FIG. 2 the closure element 15 is pivotably connected to the ring segment 13 by a integrated hinge 19, for example.

The closure element 15 has a locking device 18 for locking the closure element 15 in the recess 14, which in the present embodiment is designed as a catch spring, such that the ring segment 13 and the closure element 15 can be connected by means of a snap-on connection. The snap-on connection is designed in such a way that it has flexible properties in the installation direction—that is to say, it enables installation of the closure element 15.

Figure 3:
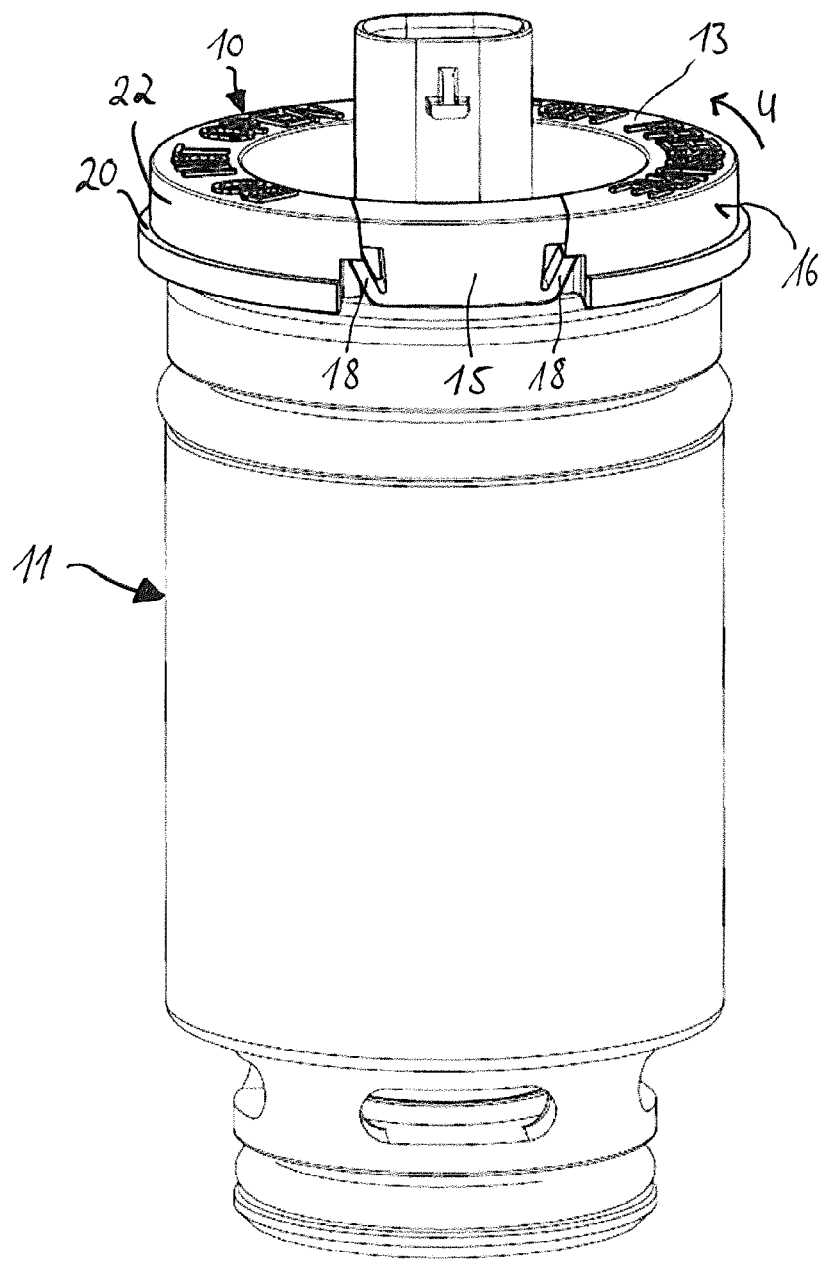
FIG. 3 is a perspective view of the retaining ring of FIG. 2, with a switching valve.

FIG. 3 shows the retaining ring 10 in the installed state on the component 11. The retaining ring 10 is attached to the component 11, the closure element 15 closing the recess 14. The closure element 15 is also designed as a ring segment, such that the ring segment 13 and the closure element 15 form a circumferentially closed ring element, wherein the cross sections of the closure element 15 and the ring segment 13 can differ.

The locking device 18 is concealed by the closure element 15 and the ring segment 13 on the side of the retaining ring 10 facing away from the contact surface 17, and on the inside of the retaining ring 10. The locking device 18 is thus inaccessible from these sides.

Figure 5:
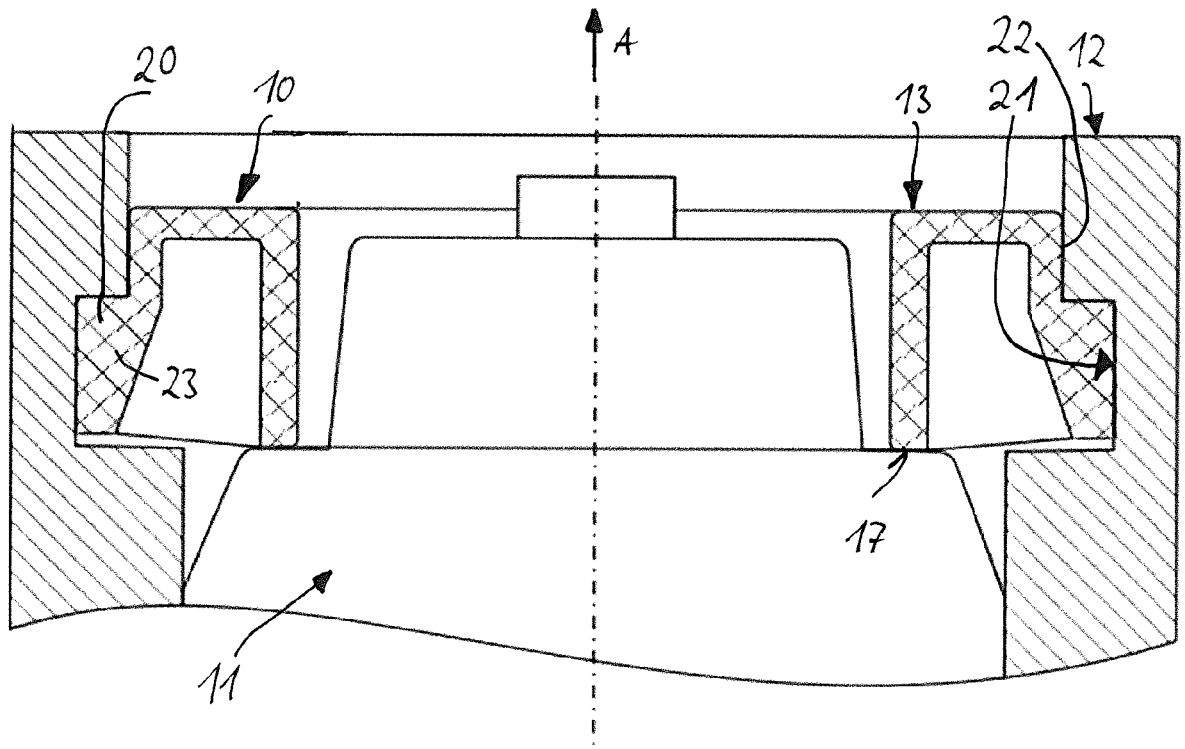
FIG. 5 is a cross-sectional view of the retaining ring according to the invention, according to a fourth embodiment, with a switching valve and a housing.
Figure 6:
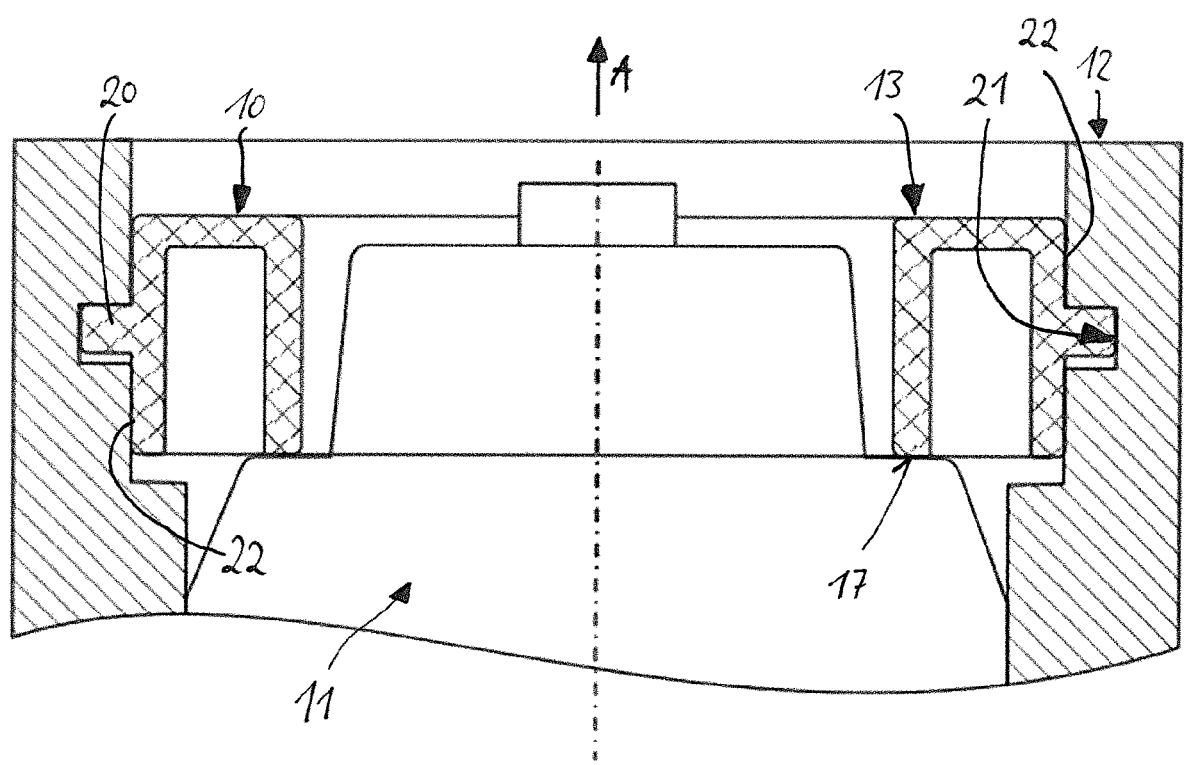
FIG. 6 is a cross-sectional view of the retaining ring according to the invention, according to a fifth embodiment, with a switching valve and a housing.

FIGS. 5 and 6 show a cross-sectional view in which a housing 12 is also shown. This view shows that the locking device 18 in the installed state is concealed by the component 11 and the housing 12 on the outside of the retaining ring 10 and on a side facing the contact surface 17. This prevents improper disassembly, since after the installation of the ring segment 13 and the locking element 15, the locking device 18 can no longer be accessed and the locking element 15 can consequently no longer be released without destroying or visibly damaging the retaining ring 10.

The snap-on connection thus represents a suitable connection design for preventing improper disassembly, which also enables particularly easy installation of the retaining ring 10, since the connection is established automatically when the closure element 15 is inserted without further installation steps being required. Finally, the forces that occur during operation can be reliably absorbed by the snap-on connection, thereby preventing the retaining ring 10 from jumping out of the housing 12 in an undesired manner.

Figure 4:
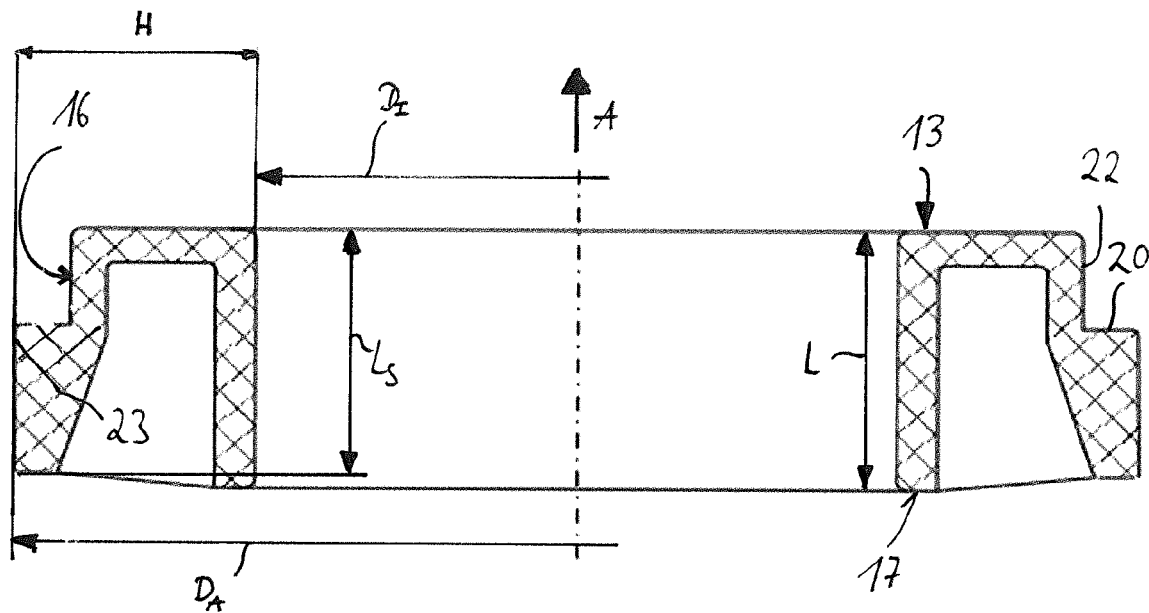
FIG. 4 is a cross-sectional view of the retaining ring according to the invention, according to a third embodiment.

FIG. 4 shows a cross section of the ring segment 13. A ratio of a length L in the axial direction A of the ring segment 13 to a height H of the ring segment is advantageously between 0.5 and 5, particularly advantageously between 0.75 and 2.5. The height H of the ring segment is defined as half the difference between the outer diameter DA and the inner diameter DI. The length L corresponds to the extension of the ring segment 13 in the axial direction A. The specified ratios lead to a high geometrical moment of inertia against torsion, since the length L of the ring segment in the axial direction A is approximately as great or greater than its height H.

A ratio of the inner diameter DI of the ring segment 13 to the height H is advantageously at least 3, particularly advantageously at least 4. This ensures a resilience that is sufficient to compress the ring segment 13 made of a plastics material for installation without damage.

A ratio of the length L to the inner diameter DI of the ring segment 13 is advantageously at least 1:8, particularly advantageously at least 1:6.

The ring segment 13 has high torsional stiffness because the cross section of the ring segment 13 has the highest possible geometrical moment of inertia with respect to torsion, but at the same time a reduction in the overall diameter during installation is still possible without destruction. As such, the closure element 15 cannot be removed by bending or twisting the retaining ring 10 as a whole. Due to advantageous ratios of length L, height H and inner diameter DI of the ring segment 13, it is sufficiently torsion-resistant to be able to transmit high axial forces. In addition, the provision of stiffening regions 23 and/or stiffening ribs (not shown) improves the rigidity of the retaining ring 10. In addition, no further supporting structures with the task of preventing twisting of the retaining ring 10, and thus undesired disassembly, are necessary.

FIGS. 5 and 6 show the arrangement of the retaining ring 10, with the component 11 and the housing 12. It can be seen in this case that the component 11 is secured in the axial direction A by the retaining ring 10, since it rests against the contact surface 17 and is thus fixed in the axial direction A. A support shoulder 22 formed on the outer circumference 16 rests against a housing wall in order to prevent the retaining ring 10 from being jammed. The projection 20 of the retaining ring 10 engages in a recess 21 of the housing 12, which in the present case is designed as a circumferential housing groove, such that the retaining ring 10 is fixed in a form-fitting manner in the axial direction A in the housing 12.

In the installation of the retaining ring 10, the ring segment 13 is first compressed or contracted in order to elastically reduce the outer diameter DA of the ring segment 13 to an installation diameter. Then the ring segment 13 is introduced into the housing 12 in such a way that the contact surface 17 rests against the component 11 in order to fix it in the axial direction A. The ring segment 13 is then released so that it springs back to the outer diameter DA, and is fixed in a form-fitting manner in the axial direction A in the recess 21 of the housing 12 by means of the projection 20 attached to the outer circumference 16. Finally, the recess 14 is closed off by means of the closure element 15.

The retaining rings 10 according to these embodiments prevent improper disassembly and have a high degree of rigidity, in particular high torsional rigidity.

The invention claimed is:

1. A retaining ring for securing a component, comprising:
a ring segment having an outer circumference for fixing the retaining ring in an axial direction, and
a recess extending along a circumferential direction of the ring segment, and
a closure element for releasably closing off the recess,
the ring segment forming a contact surface to fix the component in the axial direction, and the retaining ring having a locking device provided on the closure element for locking the closure element in the recess,
wherein the ring segment and the closure element form a circumferentially closed ring body after the closure element has been inserted in the recess of the ring segment, and
wherein the locking device is concealed by the closure element and the ring segment on a side of the retaining ring facing away from the contact surface, and the locking device is further concealed on an inside of the retaining ring, wherein an upper surface of the locking device is engaged with an upper surface of an undercut located in the recess, such that the locking device is inaccessible from a top side of the retaining ring facing away from the contact surface or on an inside of the retaining ring after installation of the ring segment and the closure element.

2. The retaining ring according to claim 1, wherein the locking device is concealed by the closure element and/or the ring segment on the side of the retaining ring facing away from the contact surface.

3. The retaining ring according to claim 1, wherein the locking device is provided on the closure element, the locking device being molded or integrated into the closure element.

4. The retaining ring according to claim 1, wherein the locking device is a catch spring.

5. The retaining ring according to claim 1, wherein the closure element and the ring segment are separate individual parts.

6. The retaining ring according to claim 1, wherein the closure element is pivotably connected to the ring segment.

7. The retaining ring according to claim 1, wherein the outer circumference has a projection for engaging in a recess of a housing.

8. The retaining ring according to claim 1, wherein the closure element and/or the ring segment are made of plastic material.

9. The retaining ring according to claim 1, wherein a ratio of a length in the axial direction of the ring segment to a height of the ring segment is between 0.5 and 5.

10. The retaining ring according to claim 1, wherein a ratio of an inner diameter of the ring segment to a height of the ring segment is at least 3.

11. The retaining ring according to claim 1, wherein a ratio of a length to an inner diameter of the ring segment is at least 1:8.

12. An arrangement, comprising a housing and a component secured in the housing by the retaining ring according to claim 1.

13. The arrangement according to claim 12, wherein the retaining ring is fixed in the axial direction in the housing by the outer circumference, with the contact surface contacting the component to fix the component in the axial direction.

14. The arrangement according to claim 12, wherein the component is a switching valve or a cover of a strut support bearing or strut head bearing, and the housing is part of an air spring of a commercial or passenger vehicle.

15. The retaining ring according to claim 6, wherein the closure element is connected to the ring segment by an integrated hinge.

16. The retaining ring according to claim 9, wherein the ratio of a length in the axial direction of the ring segment to a height of the ring segment is between 0.75 and 2.5.

17. The retaining ring according to claim 10, wherein the ratio of an inner diameter of the ring segment to a height of the ring segment is at least 4.

18. The retaining ring according to claim 11, wherein the ratio of the length to the inner diameter of the ring segment is at least 1:6.

19. The arrangement according to claim 13, wherein the retaining ring is fixed in the axial direction in the housing in a form-fitting manner.

20. A method for installing a retaining ring, comprising:
providing a housing in which a component is arranged, and providing a retaining ring according to claim 1, wherein the recess is not closed off,
compressing or contracting the ring segment to elastically reduce an outer diameter of the ring segment to an installation diameter,
inserting the ring segment into the housing such that the contact surface rests against the component to fix the component in the axial direction,
releasing the ring segment, such that the ring segment springs back to the outer diameter and is fixed in the housing in the axial direction by its outer circumference, and
closing off the recess by the closure element.

21. The method according to claim 20, wherein the ring segment springs back to the outer diameter and is fixed in the housing in the axial direction in a form-fitting manner by its outer circumference.

* * * * *